United States Patent [19]
Danforth

[11] 3,733,888
[45] May 22, 1973

[54] FREENESS TESTING APPARATUS AND METHOD FOR OPEN CONTAINERS

[75] Inventor: Donald W. Danforth, Andover, Mass.

[73] Assignee: Bolton-Emerson, Inc., Lawrence, Mass.

[22] Filed: Apr. 28, 1971

[21] Appl. No.: 138,075

[52] U.S. Cl. .................................. 73/63, 162/198
[51] Int. Cl. ........................................... G01n 33/34
[58] Field of Search ........................ 73/63, 61.1 R; 162/198

[56] References Cited

UNITED STATES PATENTS

| | | | |
|---|---|---|---|
| 3,538,749 | 11/1970 | Danforth | 73/63 |
| 2,435,578 | 2/1948 | Ferraez, Jr. | 73/61 R |
| 3,186,215 | 6/1965 | Danforth | 73/63 |
| 3,330,151 | 7/1967 | Reinhall | 73/63 |
| 3,368,392 | 2/1968 | Miller | 73/63 |

*Primary Examiner*—Richard C. Queisser
*Assistant Examiner*—Joseph W. Roskos
*Attorney*—Pearson & Pearson

[57] ABSTRACT

A freeness detector of the vertical stand pipe type, used on closed paper stock lines, is combined with an open vessel containing groundwood paper stock or the like with the open intake end of the freeness detector submerged, but the screen above the level of the stock. Sub-atmospheric pressure in the filtrate chamber permits atmospheric pressure to raise filtrate for testing and positive pressure blows the filtrate and mat downwardly. The apparatus preferably also includes an agitator in the stock and back flushing liquid passages in the detector.

9 Claims, 4 Drawing Figures

INVENTOR.
DONALD W. DANFORTH
BY
Pearson + Pearson
ATTORNEYS

FREENESS TESTING APPARATUS AND METHOD FOR OPEN CONTAINERS

DESCRIPTION OF THE PRIOR ART

Freeness testers of the type disclosed herein are now well known in the art as taught in my U.S. Pat. No. 3,186,215 of June 1, 1965, entitled "Freeness Testing Apparatus and Method" and sold under the name DRAINAC by Bolton-Emerson Inc. of Lawrence, Massachusetts. In general, such detectors have their open, lower intake ends connected into a closed paper stock line, or system, at a predetermined stock pressure, the sample being drawn upwardly through the transverse screen into the closed end, upper filtrate chamber by connection to vacuum, or atmosphere, to form a mat on the screen. When filtrate level has been measured and recorded, the filtrate and mat are blown down and back into the system by positive air pressure, with the testing cycle repeated automatically by a cycle timer.

In my U.S. Pat. No. 3,538,749 of Nov. 10, 1970, s similar freeness detector is shown with an improved control and a variable volume chamber and in U. S. Pat. No. 3,368,392 to Miller of Feb. 13, 1968, a freeness tester of this type with a chamber of non-uniform diameter is disclosed.

The above mentioned freeness testers are all mounted on closed stock lines, rather than on by-pass or sampling lines, and are thus distinguishable from the tester disclosed in U. S. Pat. No. 2,734,378 to Meyers of Feb. 14, 1956, wherein the tester is completely submerged in stock obtained in a by-pass, or sampling line, with a filtrate outlet above the screen and the screen and filtrate chamber always below the level of the stock.

SUMMARY OF THE INVENTION

In this invention the tubular freeness tester is preferably vertical with the intake end below stock level and the screen and filtrate chamber above stock level, so that filtrate is obtained only when negative pressure, or vacuum, is applied to the filtrate chamber, thereby permitting atmospheric pressure to raise the stock in the detector.

The tester is clamped adjustably on the wall of an open container of groundwood, or other paper stock, so that the open intake end is about 3 or 4 inches below stock level or at a predetermined height above the bottom of the container.

The invention also includes agitator means in the open container to move the stock past the open intake end of the tester at at least 1 foot per second to assure a well mixed sample and to assure the disintegration of the mat formed during testing. Also included preferably are back flushing passages in the tester connected to a source of clean dilution water for flushing the screen and intake end from within the filtrate chamber end.

Figure 1:
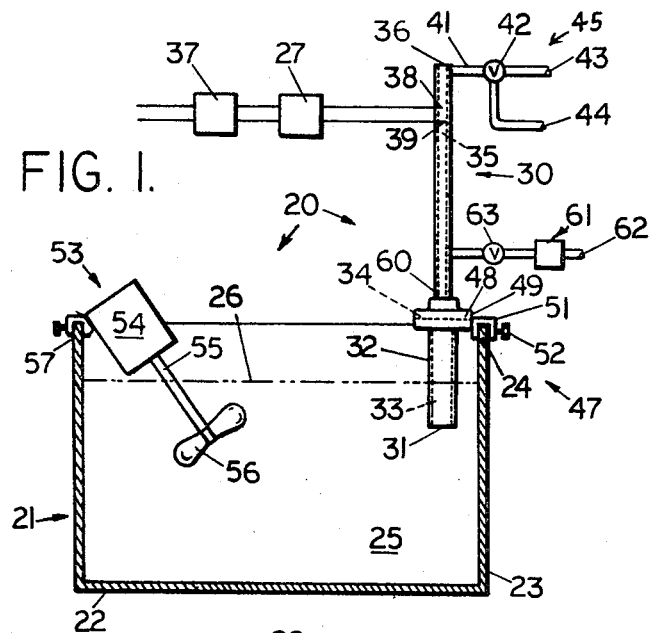
FIG. 1 is a diagrammatic, front elevational view of the apparatus of the invention.
Figure 2:
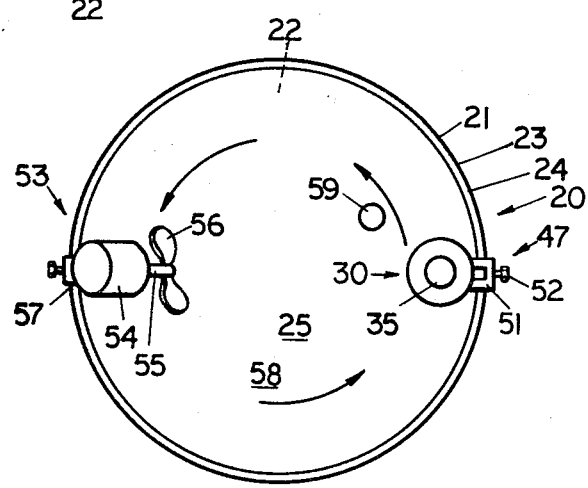
FIG. 2 is a diagrammatic plan view thereof.

In the drawing, the open vessel freeness detector apparatus 20 of the invention includes an open vessel, such as the container 21, having a bottom 22 and an upstanding wall 23 with a rim 24 adapted to hold the groundwood, or other paper stock, 25 exposed to atmospheric pressure at a level 26. The invention is particularly useful in groundwood stock operations because the freeness of the stock in a container such as 21 can be periodically and repeatedly tested automatically, the tests recorded on the read-out panel 27 and transmitted to the grinders to control the pressure of wood against stone to correct to the desired standards of quality and uniformity. It will be understood that the container 21 may be any kind of trough, flume, grinding pit or forming pond which is open to the atmosphere, rather than closed to the atmosphere and pressurized as in a closed stock line.

The tubular freeness detector 30 is similar to the detectors shown and described in my above mentioned patents and therefore need not be described in detail since it and its control system are well known in the trade. However, unlike the detectors of the said patents, the open intake end 31 of the detector is not connected into a closed line at the conventional 15 p.s.i. but is submerged about 3 or 4 inches below the level 26 at a predetermined height above the bottom 22. The intake tube 32 is preferably about 4 inches in diameter and forms a stock intake chamber 33 on the under side of the transverse screen 34, while a filtrate chamber 35, of about 1 inch in diameter, is formed on the upper side of the screen, the chamber 35 having a closed end 36.

The read-out panel 27 forms part of a time interval control system 37 which includes sensing means 38 within filtrate chamber 35, such as one or more electrodes 39 for sensing the height of filtrate therein and by means of suitable electric circuits, changing the refining, or grinding effect of refiners or grinders producing the paper stock being tested, all in a well known manner not shown.

The filtrate chamber 35 is connected by a pneumatic conduit 41 to a valve 42, the valve selectively connecting conduit 41 to a vacuum exhaust circuit 43 such as mill vacuum or a suction pump and tank, or connecting conduit 41 to a blow-down circuit 44 such as a source of positive pressure, mill air pressure, etc. Conduit 41, valve 42 and circuits 43 and 44 form automatic positive and negative air pressure control means 45, controlled by the cycle timer 37 and sensing means 38 to periodically permit atmospheric pressure to raise stock into chamber 35 for testing of freeness and then to blow the detector free of the sample tested.

Apparatus 20 includes clamping means 47, having a split band 48 tightenable on the detector 30 by set screw 49, and having a bracket 51 with set screw 52 for detachably affixing the band 48 on the rim 24 of the container 21. The detector 30 may thus be clamped at any desired height depending on liquid level 26.

Apparatus 20 preferably also includes powered agitation means 53 for moving the stock 25 in container 21, at least in the area of intake end 31, at 1 foot per second or more. Agitator means 53 may be in the form of a motor 54 shaft 55 and impeller 56, submerged below stock level 26 and clamped at 57 on rim 24, or may be any other suitable powered impeller rotor adapted to move the stock in a flow path past intake end 31.

The agitation means 53 prevents settling of the fibers 58 in the stock 25 and otherwise assures that a proper sample will be tested and also assists in removing any mat 59 discharged from end 31 from the area thereof while disintegrating the mat.

Preferably detector 30 also includes passages 60 connected to a source 61 of clean dilution water 62, under pressure, and operably connected and controlled in a known manner through valve 63 to cycle timer 37 so that the screen 34, intake chamber 33 and other parts of the detector are back flushed after each test by the jet spray nozzles 64.

Figure 4:
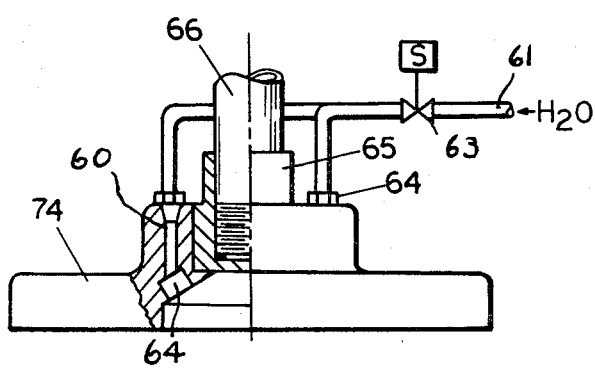
FIG. 4 is a fragmentary detail view showing an adapter flange for use with filtrate chambers of reduced diameter.

As shown in FIG. 4, an adapter flange 65 is preferably provided to accommodate filtrate chambers of reduced diameter, such as the one inch diameter tube 66, when ultra sensitivity is desired, the flange 65 including back flush passages 60 and jet spray nozzles 64.

Figure 3:
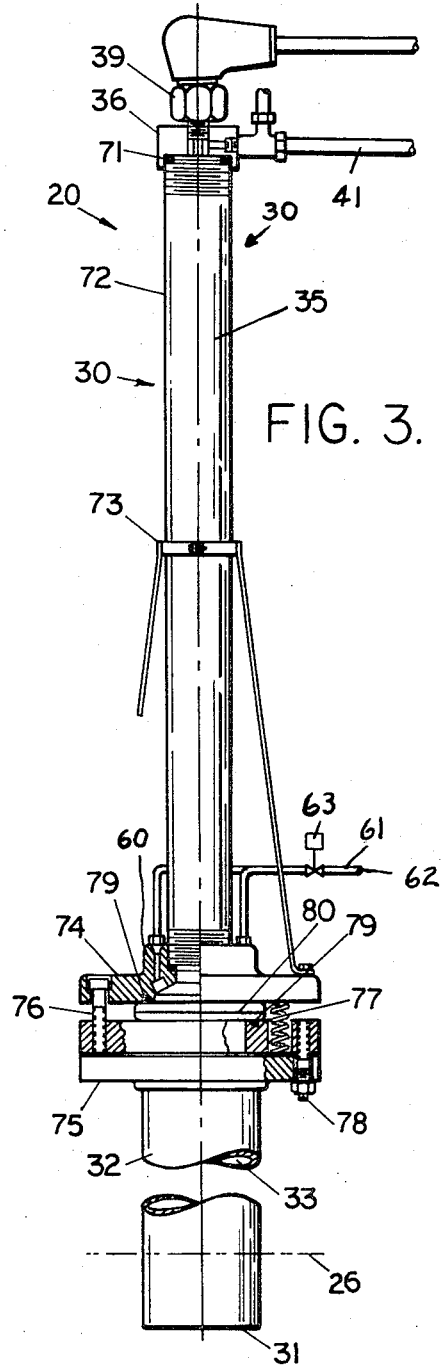
FIG. 3 is an enlarged front elevational view of the freeness detector showing the back flush passages.

The detector 30, as shown in FIG. 3, includes the concentric electrode 39 in the axial bore of threaded end closure 36, which includes gasket 71 on detector tube 72 which forms filtrate chamber 35. A brace assembly 73 is provided on the top flange 74 which is fixed to the bottom flange 75 by bolts 76 while spring loaded by coil springs 77, the bolts 78 clamping the screen 34 and gasket 79 in place, in screen holder 80.

What is claimed is:

1. Apparatus for automatically and periodically testing the freeness of paper stock in a container open to the atmosphere, said apparatus comprising:
    an open container having a bottom and having paper stock, at a predetermined level above said bottom, exposed to atmospheric pressure;
    a tubular freeness detector, having a transverse screen, for separating fibers from liquid in said paper stock, said screen dividing said detector into a stock intake chamber with an open intake end and a filtrate chamber with a closed end;
    means supporting said freeness detector on said container at a predetermined level relative to said container bottom, with the open end of said intake chamber submerged below stock level at a spaced distance above said bottom and with said screen and filtrate chamber above stock level; and
    automatic super atmospheric and sub atmospheric air pressure control means operably connected to said filtrate chamber, for periodically reducing pressure in said chamber below atmospheric pressure to draw filtrate through said screen thereinto for testing while forming a mat on the intake side of said screen and then blowing said mat and filtrate out of said open intake end back into said container.

2. Apparatus as specified in claim 1, wherein:
    said support means includes clamping mechanism for detachably affixing said detector vertically on the rim of an upstanding side wall of said container and for detachably affixing said tubular detector at selected heights in said clamping mechanism.

3. Apparatus as specified in claim 1, plus:
    jet spray, back-flushing means built into said detector; and
    automatic means for supplying flush liquid thereto after each testing cycle.

4. Apparatus for sampling and testing the freeness of paper stock, said apparatus comprising: and pulse
    a paper stock container open to the atmosphere and having an upstanding wall and a bottom;
    a freeness detector, of the vertical stand pipe type, mounted vertically on said wall of said container with the open end thereof below stock level and at a spaced distance above said bottom and the screen and upper end thereof above stock level; and
    automatic means for periodically connecting the upper end of said detector to a source of sub atmospheric pressure to raise filtrate therein through said screen for testing while forming a mat on the intake side thereof and then connecting said upper end to a source of super atmospheric pressure to blow said filtrate and mat back down through said open end of said detector into said container.

5. Apparatus as specified in claim 4, plus:
    flushing passages in said detector for jet spraying back flush liquid through said screen and out of said open end; and
    liquid pressure control means operably connecting said flushing passages to a source of liquid for flushing said detector during each blow-down thereof.

6. Apparatus as specified in claim 4, plus:
    agitation means associated with said detector in said container, said agitation means continually urging the paper stock in said container in a predetermined flow path to avoid fiber settlement therein.

7. Apparatus as specified in claim 4, plus:
    a power driven agitator, mounted on the wall of said container with an impeller submerged below the level of the stock therein to move said stock past said open end at a speed of at least one foot per second.

8. The method of testing the freeness of groundwood paper stock in an open container by means of a vertical stand pipe freeness detector which comprises the steps of:
    mounting said stand pipe on said container with its open lower intake end below stock level at a spaced distance above the container bottom and with its screen above stock level;
    periodically applying sub atmospheric pressure to the upper end of said detector to permit atmospheric pressure to raise filtrate through said screen into the filtrate chamber for testing while forming a fiber mat on the intake side thereof and then applying super atmospheric pressure thereto to blow said filtrate, and the fiber mat on said screen, down and out of said intake end; and
    agitating said stock in the area of said container proximate said intake end during said testing, to assure an accurate fiber suspension and to disperse any mat created by said testing.

9. A method as specified in claim 8, plus the step of:
    back flushing and jet spraying said detector with clean dilution water through said screen from said filtrate chamber during each said blow-down step to remove any fibers stapled on said screen or trapped elsewhere in said detector.

* * * * *